United States Patent
Patsch et al.

[15] 3,671,536
[45] June 20, 1972

[54] ANTHRAQUINONE DYES

[72] Inventors: Manfred Patsch, Ludwigshafen; Heinz Ellingsfeld, Frankenthal, both of Germany

[73] Assignee: Badische Anilin- & Soda-Fabrik Aktiengesellschaft, Ludwigshafen (Rhine), Germany

[22] Filed: March 17, 1970

[21] Appl. No.: 20,405

[30] Foreign Application Priority Data

March 20, 1969 Germany..................P 19 14 207.5
Sept. 30, 1969 Germany..................P 19 49 295.6

[52] U.S. Cl..................260/307.5, 260/37 N, 260/40 R, 260/247.1, 260/247.5 B
[51] Int. Cl. .......................................................C07d 85/52
[58] Field of Search..........................260/307, 247.1, 247.5 B

[56] References Cited

UNITED STATES PATENTS 3,270,030  8/1966  Weidinger et al...................260/307.5

*Primary Examiner*—Alex Mazel
*Assistant Examiner*—R. V. Rush
*Attorney*—Johnston, Root, O'Keeffe, Keil, Thompson & Shurtleff

[57] ABSTRACT

1,4-diaminoanthraquinones bearing in position 2 a 1,2,4-oxadiazole group which is substituted in position 3 by an aromatic or aliphatic radical. These anthraquinone derivatives are valuable blue disperse dyes for use in dyeing and printing synthetic textile materials.

5 Claims, No Drawings

ANTHRAQUINONE DYES

The novel dyes are of the formula:

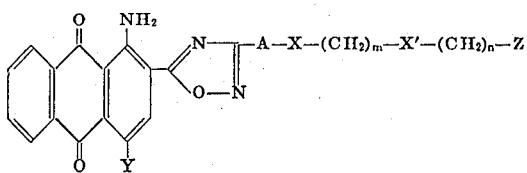

where Y stands for the radical —NH$_2$, —NNCH$_3$, NNCH$_2$H$_5$, —NH(CH$_2$)$_2$—OH, —N(C$_3$H$_7$)$_2$,

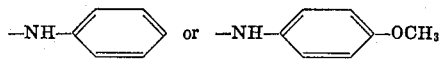

A stands for the radical

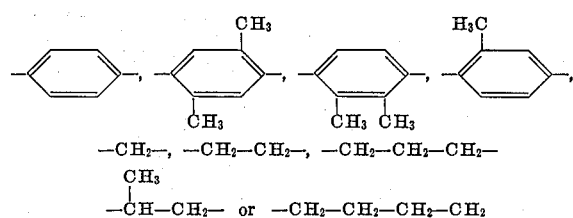

—CH$_2$—, —CH$_2$—CH$_2$—, —CH$_2$—CH$_2$—CH$_2$—

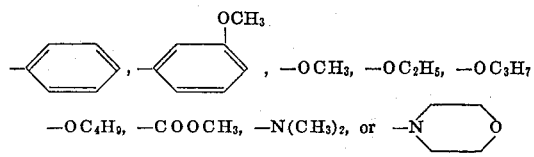

X stands for a direct link or a bridging member comprising —O—, —S— or —SO$_2$—, X' stands for a direct link or a bridging member comprising —O—, —S— or —SO$_2$—, Z stands for the radical —H, —CH$_3$, —OH, —Cl, Br, —NO$_2$, —CN,

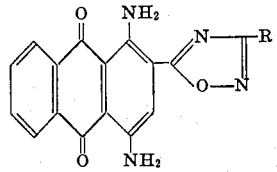, —OCH$_3$, —OC$_2$H$_5$, —OC$_3$H$_7$

—OC$_4$H$_9$, —COOCH$_3$, —N(CH$_3$)$_2$, or 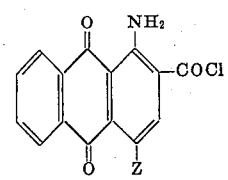

$m$ stands for zero, 1 or 2 and
$n$ stands for zero, 2 or 3.

Suitable radicals of the formula —A—X—(CH$_2$)$_m$—X'—(CH$_2$)—Z are for example:

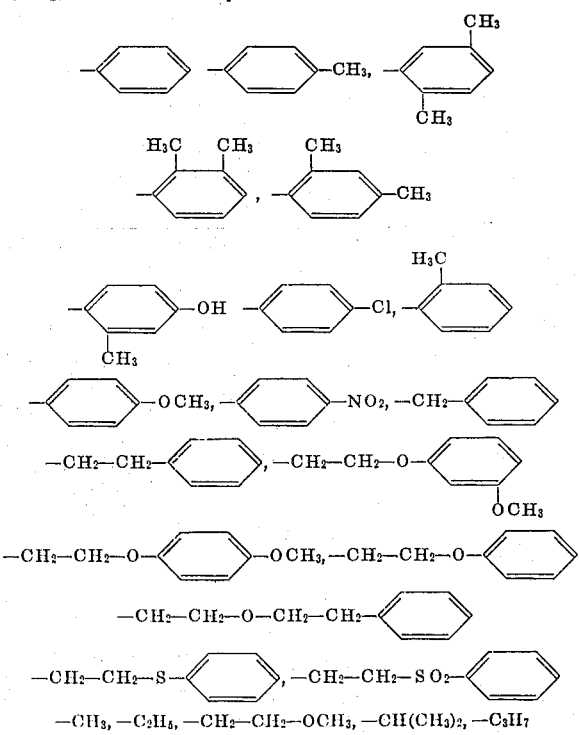

—CH$_3$, —C$_2$H$_5$, —CH$_2$—CH$_2$—OCH$_3$, —CH(CH$_3$)$_2$, —C$_3$H$_7$

—CH$_2$—CH$_2$—Cl, —CH$_2$—CH$_2$—CH$_2$—O—CH$_3$
—CH$_2$—CH$_2$—CH$_2$—CH$_2$—Cl, —CH$_2$—CH$_2$—COOCH$_3$
—CH$_2$—CH$_2$—Br, —CH$_2$—CH$_2$—CH$_2$—Cl
—CH$_2$—CH$_2$—CH$_2$—CH$_2$—Cl, —CH$_2$—CH$_2$—CN

—CH(CH$_3$)—CH$_2$—CH$_2$—S—C$_2$H$_5$, —CH(CH$_3$)—CH$_2$—OCH$_3$

—CH(CH$_3$)—CH$_2$—S—CH$_2$—CH$_2$—OH, —CH(CH$_3$)—CH$_2$—O—CH(CH$_3$)$_2$
—CH$_2$—CH$_2$—S—CH$_2$—CH$_2$—OH, —CH$_2$—CH$_2$—O—CH$_2$—CH(CH$_3$)$_2$
—CH$_2$—CH$_2$—O—CH$_2$—CH$_2$—S—C$_2$H$_5$
—CH$_2$—CH$_2$—O—CH$_2$—CH$_2$—SO$_2$—C$_2$H$_5$
—CH$_2$—CH$_2$—O—CH$_2$—CH$_2$—O—C$_4$H$_9$
—CH$_2$—CH$_2$—O—CH$_2$—CH$_2$—O—C$_3$H$_7$
—CH$_2$—CH$_2$—O—CH$_2$—CH$_2$—O—CH$_2$—CH$_2$—OC$_2$H$_5$
—CH$_2$—CH$_2$—O—CH$_2$—CH$_2$—O—CH$_2$CH$_2$O—C$_3$H$_7$
—CH$_2$—CH$_2$—O—CH$_2$—CH$_2$—O—CH$_2$—CH$_2$—O—C$_4$H$_9$
and
—CH$_2$—CH$_2$—O—CH$_2$—CH$_2$—S—C$_2$H$_5$ of special commercial interest are the blue dyes of the formula:

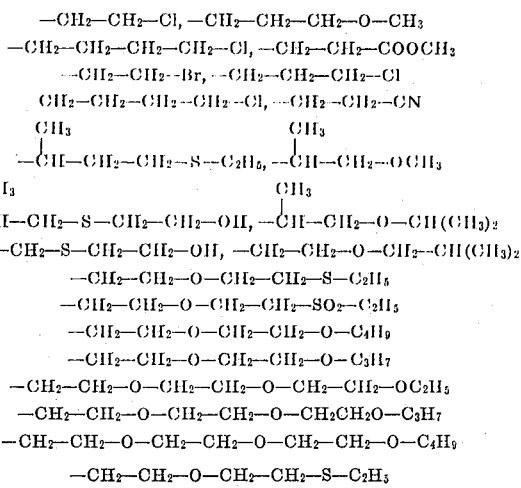

where R stand for the radical

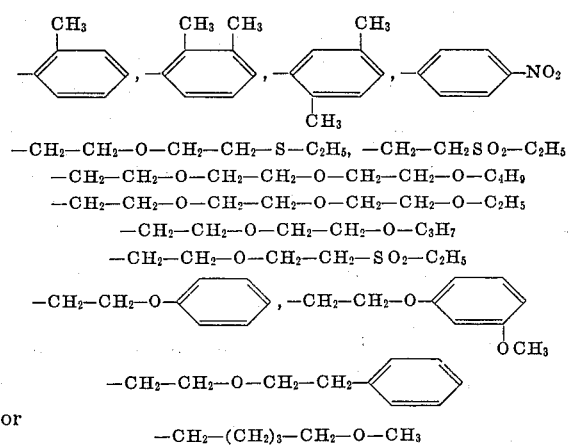

—CH$_2$—CH$_2$—O—CH$_2$—CH$_2$—S—C$_2$H$_5$, —CH$_2$—CH$_2$SO$_2$—C$_2$H$_5$
—CH$_2$—CH$_2$—O—CH$_2$—CH$_2$—O—CH$_2$—CH$_2$—O—C$_4$H$_9$
—CH$_2$—CH$_2$—O—CH$_2$—CH$_2$—O—CH$_2$—CH$_2$—O—C$_2$H$_5$
—CH$_2$—CH$_2$—O—CH$_2$—CH$_2$—O—C$_3$H$_7$
—CH$_2$—CH$_2$—O—CH$_2$—CH$_2$—SO$_2$—C$_2$H$_5$

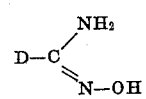

or
—CH$_2$—(CH$_2$)$_3$—CH$_2$—O—CH$_3$

The novel dyes may be produced, for example, by reacting anthraquinone carboxylic acid chlorides of the formula:

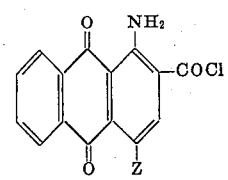

where Z stands for the aforementioned radical Y or for a nitro group, with carboxylic acid amidoximes of the formula:

$$D-C\overset{NH_2}{\underset{N-OH}{}} \qquad IV$$

or the corresponding hydrochlorides, preferably in solvent or diluent and at a temperature of from 20° to 200° C., preferably from 100° to 180° C., and where an anthraquinone derivative of formula III is used in which the radical Z is a nitro group the dye is completed by reducing or substituting the nitro group. In formula IV above, D stands for the aforementioned group of the formula —A—X—(CH$_2$)$_m$—X—(CH$_2$)$_n$—Z.

Where, instead of the free carboxylic acid amidoximes of the formula IV, there are used the corresponding hydrochlorides, the reaction of the compounds of formula III is carried out in the presence of a basic agent.

Suitable solvents or diluents for use in the reaction of the compounds III and IV are, for example, benzene, nitrobenzene, toluene, dichlorobenzene, chlorobenzene and dimethyl formamide. Suitable basifying agents are, for example, tertiary amines, such as triethylamine, tripropylamine, ethyl diisopropylamine, pyridine or potassium carbonate. The starting materials III and IV are conveniently used in stoichiometric amounts.

Anthraquinone derivatives containing nitro groups are, following the reaction with the compounds of formula IV, reduced or reacted with amines by usual methods in order to convert the nitro group to an amino group or to substituted amino group. For example, reduction may be carried out in solvents, such as dimethyl formamide, N-methyl pyrrolidone, dichlorobenzene, glycol ethers or water, at temperatures ranging from 20° to 100° C. and beneficially from 30° to 60° C., with reducing agents such as sodium sulfide, hydrogen sulfide, sodium dithionite or hydrazine. Reactions with amines may be carried out, for example, in the solvents listed immediately above at temperatures ranging from 100° to 170° C.

The novel dyes are valuable disperse dyes for use in dyeing and printing synthetic textile materials such as fibrous materials made from polyester or polyamide fibers. The dyeings and printings thus obtained are characterized by good fastness to light and to cracking and by good thermal fastness properties. The novel dyes are also useful as pigment dyes and are suitable, for example, for the mass coloration of thermoplastic synthetic resins as also for the dope-dyeing of polyesters and polyamides.

The textile materials are dyed and printed with the novel dyes by the usual methods. Dyeing is carried out with dyebaths which conveniently contain the dyes in dispersion. Using such dyebaths, dyeing is carried out at temperatures between 95° and 100° C. at ambient pressure, or at temperatures above 100° C. by the high temperature process or the thermosol process. If it is desired to produce strong colorations at temperatures near 100° C., is is convenient to add a carrier. For printing polyester and polyamide fabrics use is made of printing pastes containing the said dyes in finely divided form together with the usual thickening agents and printing auxiliaries. It is convenient to add carriers to the printing pastes also. Very good results are also obtained when mixtures of the novel dyes are used.

In the following Examples, the parts are by weight.

EXAMPLE 1

16.6 parts of 1-amino-4-nitroanthraquinone-2-carboxylic acid chloride in 150 parts of nitrobenzene and 1 part of triethylamine are heated with 6.8 parts of benzamidoxime at 150° C. for 2 hours. The mixture is allowed to cool and is then filtered. The solid residue is suspended in a solution of 18 parts of sodium sulfide (60%, flaked) in 300 parts of water and 4 parts of n-butyl alcohol. After 2 hours at 80° C. the precipitate is filtered off and dried in vacuo at 50° C.

Yield: 15 parts of the dye of the following formula (melting point 294° to 296° C.):

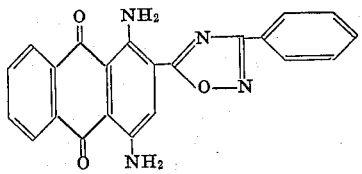

EXAMPLE 2

16.6 parts of 1-amino-4-nitroanthraquinone-2-carboxylic acid chloride and 8.2 parts of 2,5-dimethylbenzamidoxime are heated in 150 parts of nitrobenzene and 1 part of triethylamine for 2 hours at 150° C. The precipitate is filtered off and dissolved in 130 partsof N-methyl pyrrolidone and 80 parts of tripropylamine. Hydrogen sulfide is then passed through the solution for 3 hours at 30° to 40° C. The mixture is cooled and the precipitate filtered off and dried in vacuo at 50° C.

Yield: 16 parts of the dye of the following formula (melting point 300° to 302° C.):

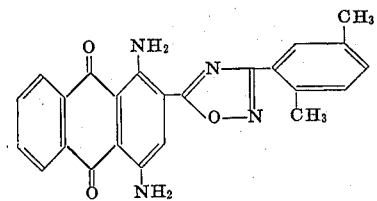

EXAMPLE 3

16.6 parts of 1-amino-4-nitroanthraquinone-2-carboxylic acid chloride and 8.2 parts of 2,4-dimethylbenzamidoxime are heated in 200 parts of glycol methyl ether and 2 parts of triethylamine for 3 hours at 150° C. After cooling, the precipitate is filtered off and dissolved in 130 parts of N-methyl pyrrolidone and 75 parts of tripropylamine. Hydrogen sulfide is then passed through the solution for 2 hours at 30° to 40° C. The mixture is cooled and filtered, and 14 parts of the dye of the following formula (m.p. 282° to 285° C.) are isolated as solid residue:

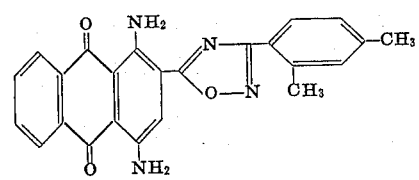

EXAMPLE 4

16.6 parts of 1-amino-4-nitroanthraquinone-2-carboxylic acid chloride and 8.2 parts of 2,3-dimethylbenzamidoxime are heated in 80 parts of nitrobenzene and 1 part of tripropylamine for 4 hours at 150° C. After cooling, the precipitate is filtered off, dried and heated in a solution of 18 parts of sodium sulfide (60% flaked) in 300 parts of water and 5 parts of n-butyl alcohol for 5 hours at 80° C. There are isolated 13 parts of the dye of the following formula (m.p. 280° to 283° C.):

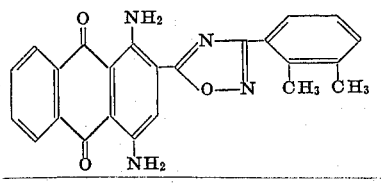

EXAMPLE 5

16.6 parts of 1-amino-4-nitroanthraquinone-2-carboxylic acid chloride are heated with 10 parts of 2-methyl-4-hydroxybenzamidoxime in 150 parts of nitrobenzene and 2 parts of triethylamine for 3 hours at 150° C. The precipitate is filtered off and dissolved in 130 parts of tripropylamine. Hydrogen sulfide is then passed through the solution for 3 hours at 30° to 40° C. There are isolated 14 parts of the dye of the following formula:

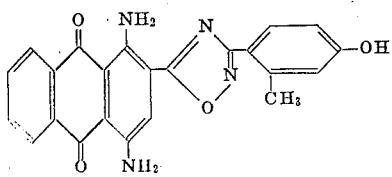

EXAMPLE 6

16.6 parts of 1-amino-4-nitroanthraquinone-2-carboxylic acid chloride, 11.5 parts of 3-(2'-ethylmercapto)ethoxypropionic acid amidoxime hydrochloride and 14.2 parts of ethyl diisopropylamine are heated together in 80 parts of nitrobenzene for 4 hours at 150° C. After cooling and effecting precipitation with 100 parts of methanol, the precipitate is filtered off and suspended in 200 parts of N-methyl pyrrolidone and 100 parts of tripropylamine. Hydrogen sulfide is passed through the suspension for 3 hours at 30° to 40° C. The mixture is cooled and filtered, and the solid residue is dried in vacuo at 50° C. There are thus isolated 16.4 parts of the dye of the following formula (m.p. 209° to 210° C):

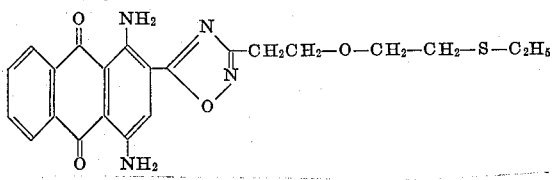

EXAMPLE 7

Example 6 is repeated except that 2-methyl-3-ethylmercapto propionic acid amidoxime hydrochloride is used as the compound of formula IV. There are thus obtained 17 parts of the dye of the formula:

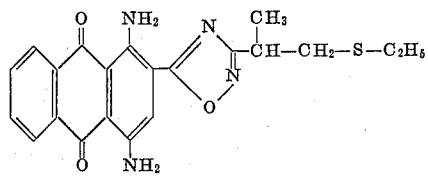

EXAMPLE 8

Example 6 is repeated except that 2-methyl-3-(2-hydroxyethylmercapto) propionic acid amidoxime hydrochloride is used as the compound of formula IV. Yield: 16 parts of the dye of the formula:

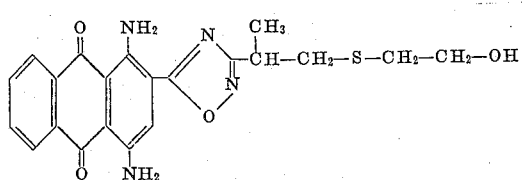

EXAMPLE 9

Example 6 is repeated except that 3-morpholino propionic acid amidoxime hydrochloride is used as the compound of formula IV. Yield: 18 parts of the dye of the formula:

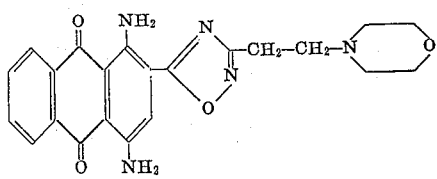

EXAMPLE 10

Example 6 is repeated except that 3-(3'-methoxyphenoxy) propionic acid amidoxime used as the compound of formula IV. There are thus isolated 15 parts of the dye of the formula:

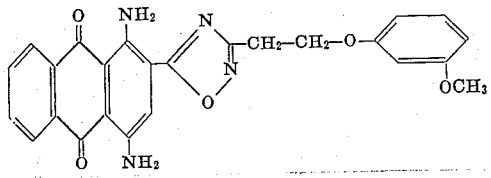

EXAMPLE 11

Example 6 is repeated except that 3-(2-ethylsulfonethoxy) propionic acid amidoxime is used as the compound of formula IV. There are thus obtained 20 parts of the dye of the formula:

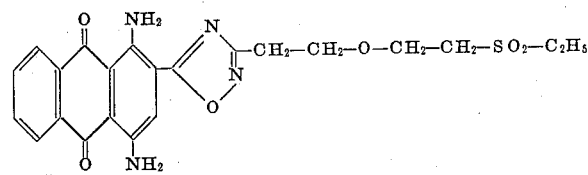

EXAMPLE 12

Example 6 is repeated except that 3-(2-n-butoxyethyl) propionic acid amidoxime is used as the compound of formula IV. There are thus obtained 23 parts of the dye of the formula:

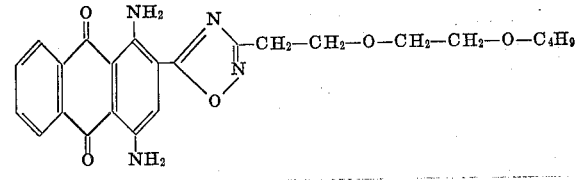

EXAMPLE 23

Example 6 is repeated except that 3-[2'-(2-propoxyethoxy)ethoxy]propionic acid amidoxime is used as the compound of formula IV. There are thus obtained 25 parts of the dye of the formula:

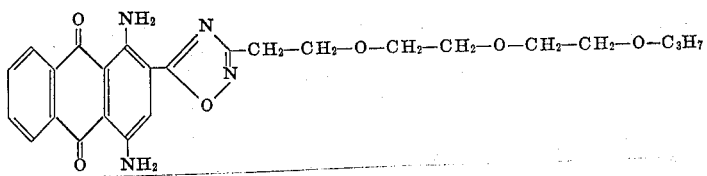

EXAMPLE 14

Example 6 is repeated except that 3-(2-phenylethoxy) propionic acid amidoxime is used as the compound of formula IV. There are thus obtained 21 parts of the dye of the formula:

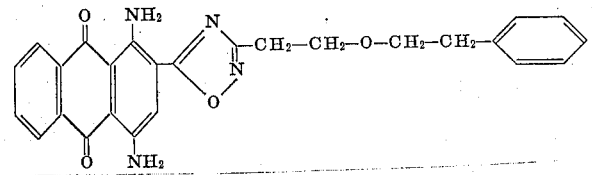

EXAMPLE 15

16.6 parts of 1-amino-4-nitroanthraquinone-2-carboxylic acid chloride, 11.5 parts of 3-(2'-ethylmercapto)ethoxy propionic acid amidoxime hydrochloride and 14.2 parts of ethyl diisopropylamine are heated in 80 parts of nitrobenzene for 4 hours at 150° C. The mixture is allowed to cool and precipitation is effected with 100 parts of methanol. The precipitate is filtered off and heated together with 5 parts of 3-amino propanol in 80 parts of butyl glycol for 3 hours at 160° to 170° C. The mixture is allowed to cool and the precipitate is filtered off. Yield: 18 parts of the dye of the formula:

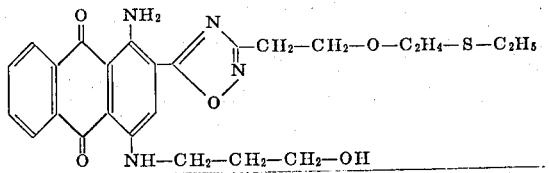

EXAMPLE 16

16.6 parts of 1-amino-4-nitroanthraquinone-2-carboxylic acid chloride, 6.8 parts of benzamidoxime and 1 part of triethylamine are heated in 150 parts of nitrobenzene for 2 hours at 150° C. The mixture is allowed to cool and the precipitate is filtered off and then heated with 5 parts of 3-methoxy propylamine in 80 parts of butyl glycol for 3 hours at 160° C. There are isolated 17 parts of the dye of the formula:

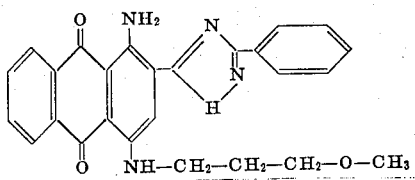

The following dyes are obtained by operating in a similar manner to that described in Example 15 and 16:

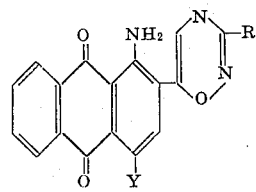

| Example | Y | R |
|---|---|---|
| 17 | —NHCH$_3$ | —CH$_2$CH$_2$—S—⟨phenyl⟩ |
| 18 | NH—C$_2$H$_5$ | —CH$_2$—CH$_2$—SO$_2$—⟨phenyl⟩ |
| 19 | —NH—CH$_2$—CH$_2$—OH | ⟨2-methylphenyl⟩ |
| 20 | —NH—⟨phenyl⟩ | ⟨phenyl⟩ |
| 21 | —NH—⟨phenyl⟩—OCH$_3$ | ⟨4-methylphenyl⟩ |
| 22 | —N(C$_3$H$_7$)$_2$ | ⟨4-methylphenyl⟩ |

EXAMPLE 23

33.2 parts of 1-amino-4-nitroanthraquinone-2-carboxylic acid chloride are reacted with 12.2 parts of acetamidoxime hydrochloride and 28.4 parts of ethyl diisopropylamine in 400 parts of nitrobenzene by heating at 100° C. for 2 hours and then at 180° C. for 4 hours. After cooling, the precipitate is filtered off and dried. There are thus obtained 28 parts of the compound of the formula:

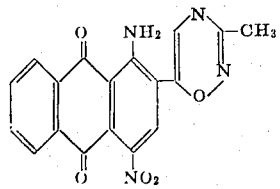

as red crystals having a melting point of 282°–285° C. The corresponding 1,4-di-aminoanthraquinone derivative is obtained by dissolving, for example, 10 parts of the 1-amino-4-nitroanthraquinone derivative in 100 parts of N-methyl pyrrolidone and 20 parts of tripropylamine and passing hydrogen sulfide through the solution for 3 hours at 60° to 70° C. After cooling, the precipitate is filtered off and there are obtained 8 parts of 1,4-diaminoanthraquinone derivative, m.p. 281° C. The dye dyes polyester and polyamide fabrics in blue shades.

EXAMPLE 24

33.2 parts of 1-amino-4-nitroanthraquinone-2-carboxylic acid chloride are dissolved in 400 parts of dimethyl formamide. 13.8 parts of propionic acid amidoxime hydrochloride and 31.5 parts of tripropylamine are added and the mixture is heated for 2 hours at 80° C. and for 5 hours at 160° C. After cooling, the precipitate is filtered off, dissolved in 80 parts of N-methyl pyrrolidone and 10 parts of tripropylamine and reduced to the blue dye of the following formula by passing hydrogen sulfide through the solution at 70°–80° C:

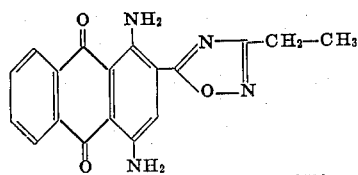

23 parts of the dye are isolated; m.p. 273°–275° C.

EXAMPLE 25

33.2 parts of 1-amino-4-nitroanthraquinone-2-carboxylic acid chloride, 17.1 parts of β-methoxypropionic acid amidoxime hydrochloride and 28.4 parts of ethyl diisopropylamine are dissolved in 500 parts of glycol dimethylether. The mixture is heated for 2 hours at 60°–70° C. and is then heated under reflux for 7 hours. After cooling, the mixture is filtered, and the residue is dissolved in 100 parts of methyl glycol and 20 parts of triethylamine. Hydrogen sulfide is passed through the solution for 1 hour at 70°–80° C. There are isolated 26 parts of the dye of the following formula (m.p. 240°–245° C.):

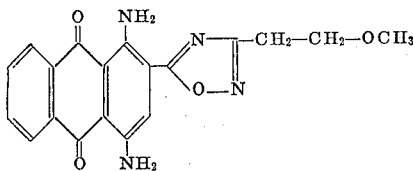

This dye dyes polyester and polyamide fabrics in blue shades.

EXAMPLE 26

33.2 parts of 1-amino-4-nitroanthraquinone-2-carboxylic acid chloride, 13.9 parts of iso-butyric acid amidoxime hydrochloride and 31.5 parts of tripropylamine are dissolved in 500 parts of glycol dimethylether. The mixture is stirred for 2 hours at 60°–70° C. and then for 6 hours at 120°–125° C. After cooling, the resulting precipitate is filtered off and dissolved in 100 parts of N-methyl pyrrolidone and 20 parts of triethylamine. Hydrogen sulfide is passed through the solution for 4 to 5 hours at 60°–70° C. After cooling, 24 parts of the dye of the following formula are isolated by filtration:

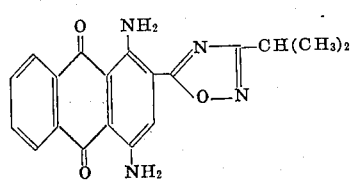

EXAMPLE 27

33.2 parts of 1-amino-4-nitroanthraquinone-2-carboxylic acid chloride and 18.8 parts of phenylacetamidoxime hydrochloride are dissolved in 120 parts of nitrobenzene and 14 parts of ethyl diisopropylamine and stirred for 2 hours at 100° C. and for a further 3 hours at 150° C. The mixture is allowed to cool and is filtered. The isolated red crystals are dissolved in 100 parts of N-methyl pyrrolidone and 10 parts of tripropylamine. Hydrogen sulfide is passed through the solution for 7 hours at 30° to 40° C. After cooling, 25 parts of the dye of the following formula are isolated (m.p. 258°–259° C.):

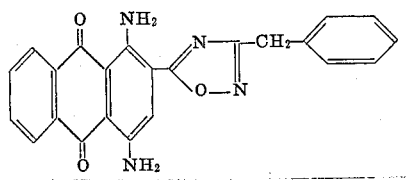

EXAMPLE 28

16.6 parts of 1-amino-4-nitroanthraquinone-2-carboxylic acid chloride, 8.4 parts of 2-methyl-3-methoxypropionic acid amidoxime hydrochloride, 14.2 parts of ethyl diisopropylamine and 120 parts of nitrobenzene are stirred for 4 hours at 150° C. The precipitate is suspended in 100 parts of N-methyl pyrrolidone and 50 parts of tripropylamine, and hydrogen sulfide is passed through at 30° to 40° C. After 3 hours, the mixture is cooled and filtered. There are thus obtained 17 parts of the dye of the formula given below (m.p. 196°–200° C.):

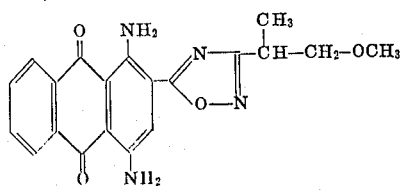

EXAMPLE 29

Example 28 is repeated except that the 2-methyl-3-methoxypropionic acid amidoxime hydrochloride is replaced by a corresponding amount of 2-methyl-3-isoproppoxypropionic acid amidoxime hydrochloride. There are thus obtained 18 parts of the dye of the formula:

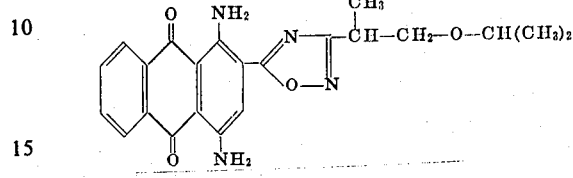

EXAMPLE 30

Example 28 0240 is repeated except that the 2-methyl-3-methoxypropionic acid amidoxime hydrochloride is replaced by a corresponding amount of 2-isobutoxypropionic acid amidoxime hydrochloride. There are thus obtained 15 parts of the dye of the formula:

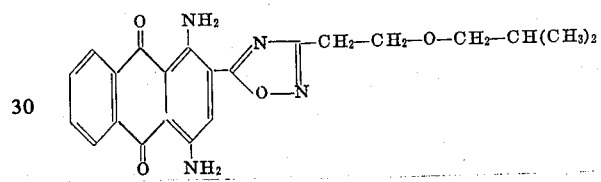

EXAMPLE 31

Example 28 is repeated except that the 2-methyl-3-methoxypropionic acid amidoxime hydrochloride is replaced by a corresponding amount of 3-dimethylaminopropionic acid amidoxime hydrochloride. There are thus obtained 15 parts of the dye of the formula:

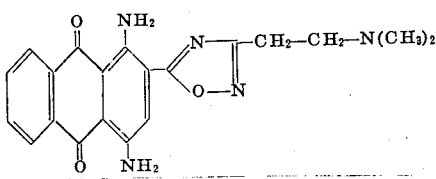

EXAMPLE 32

33.2 parts of 1-amino-4-nitroanthraquinone-2-carboxylic acid chloride, 16 parts of 2-methylbenzamidoxime and 1 part of triethylamine are heated together in 300 parts of nitrobenzene for 3 hours at 150° C. The mixture is allowed to cool and the precipitate is filtered off and suspended in a solution of 20 parts of sodium sulfide (60%, flaked) in 300 parts of water and 4 parts of n-butyl alcohol. After 2 hours at 95° C., the mixture is allowed to cool and is filtered. There are thus isolated 30 parts of the dye of the formula:

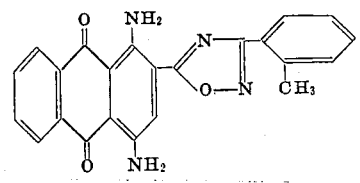

EXAMPLE 33

33.2 parts of 1-amino-4-nitroanthraquinone-2-carboxylic acid chloride, 17 parts of 4nitrobenzamidoxime and 1 part of tripropylamine are heated together in 300 parts of nitrobenzene for 3 hours at 150° C. After cooling, the precipitate is filtered off and dissolved in 200 parts of N- methyl pyrrolidone. Hydrogen sulfide is then passed through the solution to produce the dye of the following formula by reduction:

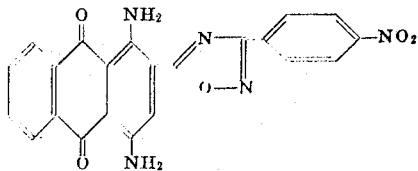

Yield: 30 parts.

EXAMPLE 34

16.6 parts of 1-nitroanthraquinone-2-carboxylic acid chloride, 12 parts of 3-[2'-(2''-butoxyethoxy)ethoxy]propionic acid amidoxime and 1 part of tripropylamine are heated together in 120 parts of nitrobenzene for 3 hours at 150° C. The mixture is allowed to cool and is filtered. The solid residue is dissolved in 100 parts of N-methyl pyrrolidone and hydrogen sulfide is passed through the solution for 3 hours at room temperature. There are then isolated 14 parts of the dye of the formula:

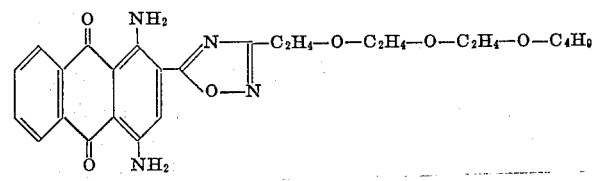

EXAMPLE 35

16.6 parts of 1-amino-4-nitroanthraquinone-2-carboxylic acid chloride, 12 parts of 3-triethoxypropionic acid amidoxime and 1 part of tripropylamine are heated together in 120 parts of nitrobenzene for 3 hours at 150° C. The mixture is allowed to cool and is filtered. The precipitate is dissolved in 100 parts of N-methyl pyrrolidone and hydrogen sulfide is passed through the solution for 3 hours at room temperature. There are then isolated 13 parts of the dye of the formula:

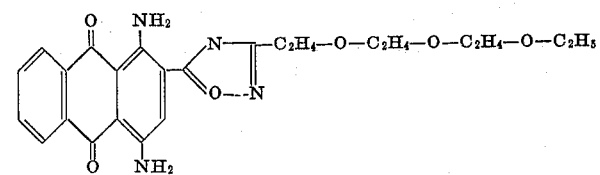

We claim:
1. An anthraquinone dye of the formula:

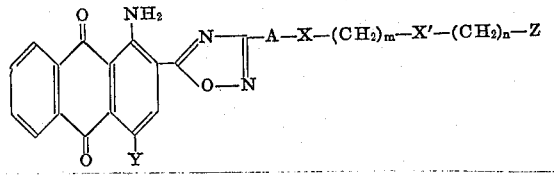

where Y stands for the radical $-NH_2$, $-NHCH_3$, $-NHC_2H_5$, $-NH(CH_2)_2-OH$, $-N(C_3H_7)_2$,

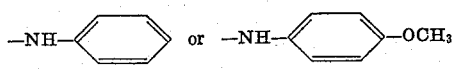

A stands for the radical

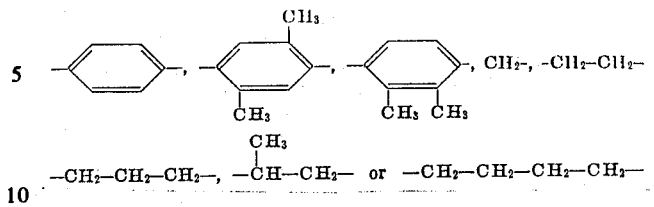

X is a direct link or the bridging member $-O-$, $-S-$ or $-SO_2-$,
X' is a direct link or the bridging member $-O-$, $-S-$ or $-SO_2-$,
Z stands for the radical $-H$, $-CH_3$, $-OH$, $-Cl$, $-Br$, $-NO_2$, $-CN$,

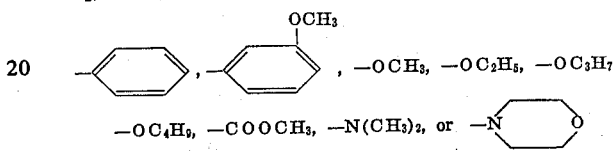

$m$ is zero, 1 or 2 and
$n$ is zero, 2 or 3, with the proviso that X and X' are direct links when both $m$ and $n$ are zero and that X' is a direct link when $m$ or $n$ is zero.

2. The dye of the formula:

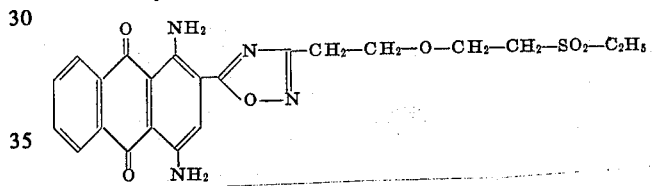

3. The dye of the formula:

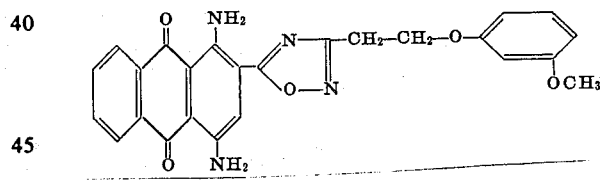

4. The dye of the formula:

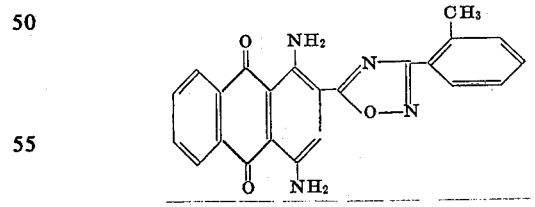

5. The dye of the formula:

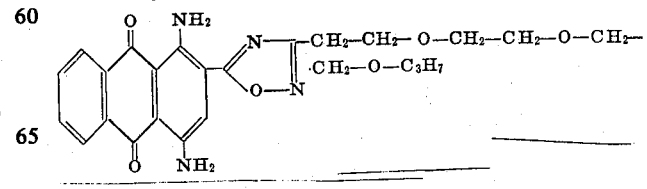

* * * * *

UNITED STATES PATENT OFFICE
CERTIFICATE OF CORRECTION

Patent No. 3,671,536           Dated June 20, 1972

Inventor(s) Manfred Patsch

It is certified that error appears in the above-identified patent and that said Letters Patent are hereby corrected as shown below:

Column 1, line 11, the right-hand portion of the formula reading "-NNCH$_3$,NNCH$_2$H$_5$," should read -- -NHCH$_3$,NHCH$_2$H$_5$, --, same column 1, lines 15, 24, 27, 40 and 49, after the first and last structure, each occurrence, insert a comma; line 59, after the first and last structure, lines 54, 63, 65, 69, 71, 73 and 75, column 2, lines 1, 2, 3, 4, 6, 9, 10, 11, 12, 13, 14, 15, 16, 17, 34, 38, 39, 40, 41, 42, 44 and line 68, column 11, after the last structure, column 12, lines 5, 9, 20 and 22, at the end of each line insert a comma. Column 1, lines 64 and 65, the left-hand portion of the structure reading

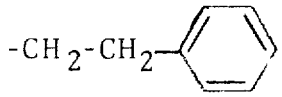      should read      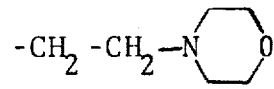

Column 2, line 22, "of special commercial interest are the blue dyes of the formula" should appear in Roman type; line 31, "stand" should read -- stands --; line 49, after the last structure insert a period; line 69, after "in" insert -- a --. Column 5, lines 11 and 12, "-ethylmercapto)ethoxypropionic acid amidoxime hydrochloride and" should appear in Roman type. Column 10, line 20, cancel "0240".

Signed and sealed this 24th day of April 1973.

(SEAL)
Attest:

EDWARD M. FLETCHER, JR.           ROBERT GOTTSCHALK
Attesting Officer                   Commissioner of Patents